(12) United States Patent
Kim et al.

(10) Patent No.: US 9,160,983 B2
(45) Date of Patent: Oct. 13, 2015

(54) METHOD OF CONTROLLING COLOR LIGHTING IN VISION SYSTEM

(71) Applicant: KOREA INSTITUTE OF INDUSTRIAL TECHNOLOGY, Cheonan-si, Chungcheongnam-do (KR)

(72) Inventors: Hyung Tae Kim, Cheonan-si (KR); Seung Taek Kim, Seongnam-si (KR); Kyeong Yong Cho, Sacheon-si (KR); Jong Seok Kim, Ansan-si (KR)

(73) Assignee: KOREA INSTITUTE OF INDUSTRIAL TECHNOLOGY, Chungcheongnam-Do (KR)

( * ) Notice: Subject to any disclaimer, the term of this patent is extended or adjusted under 35 U.S.C. 154(b) by 291 days.

(21) Appl. No.: 13/959,789

(22) Filed: Aug. 6, 2013

(65) Prior Publication Data

US 2014/0226001 A1 Aug. 14, 2014

(30) Foreign Application Priority Data

Feb. 12, 2013 (KR) .......................... 10-2013-0014766

(51) Int. Cl.
*H04N 7/18* (2006.01)
*H05B 33/08* (2006.01)

(52) U.S. Cl.
CPC ................ *H04N 7/18* (2013.01); *H05B 33/086* (2013.01)

(58) Field of Classification Search
None
See application file for complete search history.

(56) References Cited

FOREIGN PATENT DOCUMENTS

KR 10-2006-0027225 A 3/2006

*Primary Examiner* — Sath V Perungavoor
*Assistant Examiner* — Janese Duley
(74) *Attorney, Agent, or Firm* — Revolution IP, PLLC

(57) ABSTRACT

A method of controlling color lighting in a vision system is provided which is capable of rapidly searching for a voltage value which allows an optimal product image to be obtained in a vision system including a plurality of lightings. In accordance with an embodiment, a voltage value allowing an optimal product image to be obtained can rapidly searched for in a vision system including a plurality of lightings.

8 Claims, 11 Drawing Sheets

METHOD OF CONTROLLING COLOR LIGHTING IN VISION SYSTEM

CROSS REFERENCE TO PRIOR APPLICATIONS

This application claims priority under 35 U.S.C. §119 to Korean Patent Application No. 10-2013-0014766, filed on Feb. 12, 2013, which is hereby incorporated by reference in its entirety.

BACKGROUND OF THE INVENTION

1. Field of the Invention

The present invention relates to a method of controlling color lighting in a vision system, and more particularly, to a method of controlling color lighting capable of searching for a voltage value of color lighting rapidly, which allows an optimal product image to be obtained.

2. Description of the Related Art

Typically a vision system is embedded in examination equipment developed for automatically, rapidly and accurately performing various naked-eye examinations for appearance of an examination target object. The naked-eye examinations rely on human vision. The vision system plays a role of capturing and collecting digital images for the examination target object, and transferring the digital images to a processing system having a function of determining a quality of digital images.

This vision system includes a lighting device illuminating an examination target object, and a camera capturing the examination target object and creating digital images. As the camera, not an expensive color camera but a monochrome camera is mostly used.

Although the lighting device employs a predetermined monochrome lighting, nowadays, vision systems are on the increase, which employ controllable color lighting in order to effectively detect surface defects of an examination target object, like LCD appearance examination equipment disclosed in Korean Patent Application Laid-Open No. 2006-0027225.

However, since correlation between image quality and color lighting conditions for a monochrome image captured by a monochrome camera is ambiguous, an operator is required to manually find out and set optimal color lighting conditions one by one.

This scheme is not only very cumbersome, but also ambiguous, since whether the found color lighting conditions are optimal is determined according to an operator's vision and this cumbersome setting job is performed again each time an examination target object is changed.

Due to this inconvenience, when various kinds of examination target objects are to be examined, a separate vision system is embedded to each examination target object, which increases costs of the examination equipment.

Accordingly, in the case of a vision system employing color lighting, a processing system determines a quality of an examination target object through images collected by a vision system and an optimal color lighting control method is an important development target. The method maximizes image quality to allow the processing system to read images captured by a monochrome camera, and rapidly and accurately determines their quality.

In the vision system, since a large standard deviation σ of grey level I indicates that there are different contrast differences over an entire captured image, a large standard deviation value is desirable to obtain optimal images.

Meanwhile, since the grey level I varies according to a voltage V of lighting and a standard deviation σ and also varies according to a voltage of lighting, it is desirable to rapidly search for a voltage value to allow the standard deviation σ to be a maximum in order to obtain optimal images.

In the related art, as shown in FIG. 1, a scheme is used for searching for a voltage value corresponding to the largest standard deviation σ from among all standard deviations measured for a voltage value range according to each varied voltage when the voltage is continuously increased by a predetermined size.

However, in this scheme, since measurement and operations are performed for all the voltage ranges one by one, it takes a very long time. In particular, for color lighting, since a plurality of lightings is included, a more processing time is necessary.

For example, when n level voltage values are adjusted for each m lightings, $n^m$ voltage value adjustments and operations are repeated to search for optimal voltage values. Accordingly, when it is assumed that a voltage is adjusted by 0.05V in the range of 0V to 5V for three RGB optical sources, optimal conditions are obtained through million times voltage adjustments, which take a very long time.

SUMMARY OF THE INVENTION

The invention provides a method of controlling color lightings capable of rapidly searching for a voltage value which allows an optimal product image to be obtained in a vision system including a plurality of lightings.

According to an embodiment of the invention, there is provided a method of controlling color lighting in a vision system including a plurality of lightings of different wavelengths and allowing voltages of the plurality of lightings for obtaining optimal images to be searched for, the method comprising:

(S100) defining a probe W for the plurality of lightings as the following, $$\begin{bmatrix} W_1 \\ W_2 \\ W_3 \\ \vdots \\ W_{n+1} \end{bmatrix} = \begin{bmatrix} V_{I,1} & V_{II,1} & \ldots & V_{n,1} \\ V_{I,2} & V_{II,2} & \ldots & V_{n,2} \\ V_{I,3} & V_{II,3} & \ldots & V_{n,3} \\ \vdots & \vdots & & \vdots \\ V_{I,n+1} & V_{II,n+1} & \ldots & V_{n,n+1} \end{bmatrix}$$

where $V_{I,1}, V_{II,1}, V_{III,1}, \ldots$ denote respective arbitrary voltages for lightings, and n denotes the number of lightings having different wavelengths;

(s200) calculating a minus standard deviation σ for each probe point Wi according to the following equation, a minus standard deviation ρ=−standard deviation σ

$$\sigma = \sqrt[2]{\frac{1}{mn} \sum_x^m \sum_y^n (I(x, y) - Imean)^2}$$

where m denotes the number of pixels in a horizontal axis in an image, n denotes the number of pixels in a vertical axis in the image, I(x,y) denotes a grey level value of a pixel corresponding to x,y coordinate in the image, and Imean denotes an average value of grey level values of an entire image;

(s300) searching a largest maximum minus standard deviation ρmax from among minus standard deviations ρwi for probe points wi calculated in operation s200, and comparing the searched results with a minus standard deviation ρwt1 at a first test probe point Wt1, wherein a first test probe point Wt1 is formed to be outer than a first intermediate probe point Wm1 on an extension line which is formed by connecting the first intermediate probe point Wm1 and the maximum minus standard deviation probe point Wρmax, wherein the first intermediate probe point Wm1 is obtained by arithmetically averaging coordinate values of other probe points Wi except for the maximum minus standard deviation probe point Wρmax;

(s410) when the maximum minus standard deviation probe point Wρmax is larger than a minus standard deviation ρwt1 at the first test probe point Wt1 in operation 300, setting a second test probe point Wt2 to be outer than the first test probe point Wt1 along the extension line;

(s420) comparing the minus standard deviation ρwt1 at the first test probe point Wt1 and a minus standard deviation ρwt2 at the second test probe point Wt2;

(S430) when the minus standard deviation ρwt2 at the second test probe point Wt2 is larger than the minus standard deviation ρwt1 at the first test probe point Wt1 in operation s420, redefining the probe to be other points Wi except for the maximum minus standard deviation probe point Wρmax, and the first test probe point Wt1, and returning to operation s200;

(S440) when the minus standard deviation ρwt2 at the second test probe point Wt2 is smaller than the minus standard deviation ρwt1 at the first test probe point Wt1 in operation s420, redefining the probe to be other points Wi except for the maximum minus standard deviation probe point Wρmax, and the second test probe point Wt2, and returning to operation s200;

(S510) when the maximum minus standard deviation ρmax is smaller than the minus standard deviation ρwt1 at the first test probe point Wt1 in operation s300, setting the second probe point Wt2 to be inside the first intermediate probe point Wm1 along the extension line;

(S520) comparing the maximum minus standard deviation ρmax and the minus standard deviation ρwt2 at the second test probe point Wt2;

(s530) when the maximum minus standard deviation ρmax is larger than the minus standard deviation ρwt2 at the second test probe point Wt2 in operation s520, redefining the probe to be other probe points Wi except for the maximum minus standard deviation probe point Wρmax and the second test probe point Wt2;

(s540) when the maximum minus standard deviation ρmax is smaller than the minus standard deviation ρwt2 at the second test probe point Wt2 in operation s520, redefining the probe to be the maximum minus standard deviation probe point Wρmax, the first intermediate probe point Wm1, and a second intermediate probe point Wm2, wherein the second intermediate probe point Wm2 is obtained by arithmetically averaging coordinate values of the minimum minus standard deviation probe point Wρmin and the maximum minus standard deviation probe point Wρmax;

(s700) when a distance between the minimum minus standard deviation probe point Wρmin and the maximum minus standard deviation probe point Wρmax is larger than a reference value in operation s530 or s540, returning to operation s200; and (s800) when the distance between the minimum minus standard deviation probe point Wρmin and the maximum minus standard deviation probe point Wρmax is smaller than the reference value in operation s530 or s540, ending the operations.

In operation s200, the minus standard deviation may be calculated by the following equation, $$\sigma = \frac{1}{mn}\sum_x^m \sum_y^n [|I(x+1, y) - I(x, y)| + |I(x, y+1) - I(x, y)|].$$

In operation s200, the minus standard deviation may be calculated by the following equation, $$\sigma = 2\sqrt{\frac{1}{mn}\sum_x^m \sum_y^n [\{I(x+1, y) - I(x, y)\}^2 + \{I(x, y+1) - I(x, y)\}^2]}.$$

In operation s200, the minus standard deviation may be calculated by the following equation, $$\sigma = \sum_x^m \sum_y^n I(x+1, y)I(x, y) + \sum_x^m \sum_y^n I(x, y+1)I(x, y) - \sum_x^m \sum_y^n I(x+2, y)I(x, y) - \sum_x^m \sum_y^n I(x, y+2)I(x, y).$$

In operation s200, the minus standard deviation may be calculated by the following equation, $$\sigma = \sum_0^{GREYLEVEL_{max}} p_i \log_2 p_i$$

where pi(=h(i)/mn) denotes a normalized value on image histogram, and h(i) denotes the number of pixels.

In operation s300, a distance d1 between the test probe point Wt1 and the first intermediate probe point Wm1 may be the same as a distance d between the maximum minus standard deviation probe point Wρmax and the first intermediate probe point Wm1.

In operation s410, a distance d2 between the first and second test probe points Wt1 and Wt2 may be the same as a distance d1 between the first test probe point Wt1 and the first intermediate probe point Wm1.

In operation s510, a distance d3 between the first intermediate probe point Wm1 and the second test probe point Wt2 may be a half of a distance d between the maximum minus standard deviation probe point Wρmax and the first intermediate probe point Wm1.

DETAILED DESCRIPTION OF THE EXEMPLARY EMBODIMENTS

The present invention will now be described more fully with reference to the accompanying drawings, in order for those skilled in art to easily carry out. The invention may, however, be embodied in many different forms and should not be construed as being limited to the embodiments set forth herein.

Figure 1:
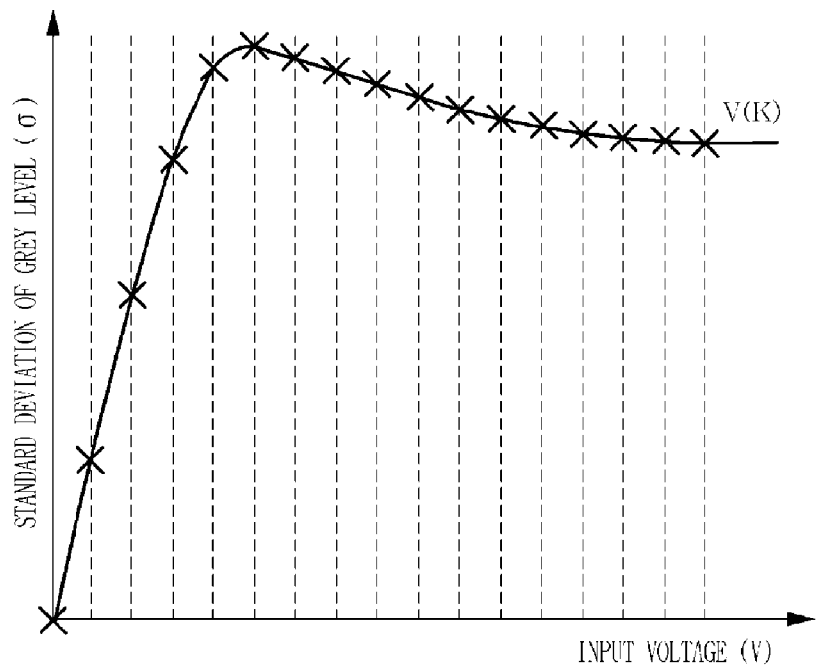
FIG. 1 illustrates a method of controlling color lighting for obtaining an optimal image in the related art.
Figure 2:
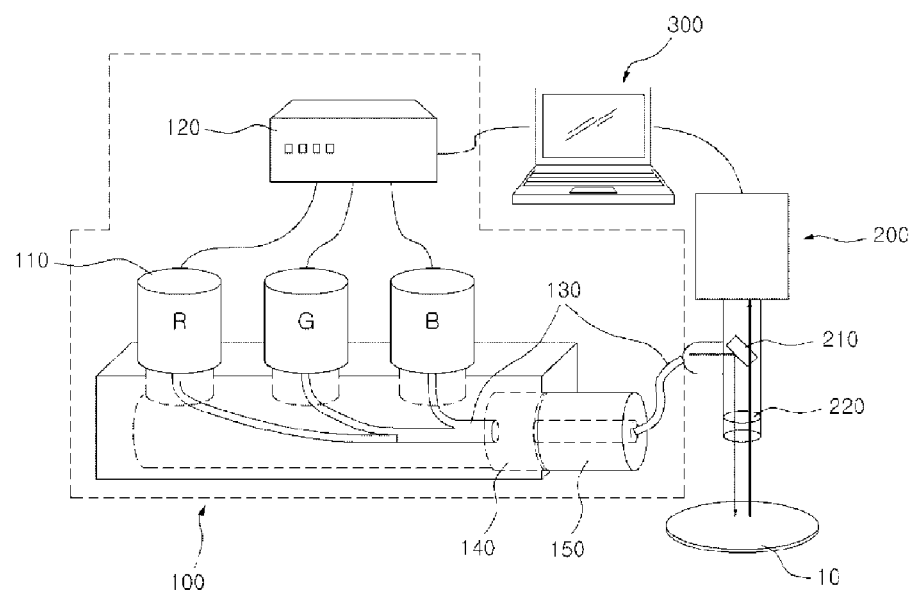
FIG. 2 illustrates a vision system capable of realizing a method of controlling color lighting in a vision system according to the invention.

Hereinafter, a vision system for examination equipment to which a method of controlling color lighting according to the invention is applied with reference to FIG. 2.

The vision system captures and collects digital images of an examination target object, and transfers the digital images to a processing system having a function of determining a quality of digital images. The vision system includes a lighting device 100, a camera 200, and a control system 300.

The lighting device 100 illuminates a light to an examination target object 10 in order for the camera 200 to capture images of the examination target object 10, and includes a plurality of lighting units 110 illuminating lights having different wavelengths, an amplifier 120, optical fibers 130, a mixer 140, and a connection unit 150.

In the vision system to which the invention applies, the plurality of lighting units 110 are implemented with LED lighting devices respectively emitting red R, green G, and blue B lights, which are the three primary colors of light, but an implementation scheme thereof is not limited thereto. The vision system may include two LED lighting devices illuminating lights having different wavelengths from each other, or further include an LED illuminating a white light W to have four or more LED lighting devices.

The amplifier 120 is disposed between the control system 300 controlling inputs to the plurality of lighting units 110 and the plurality of lighting units 110, and amplifies a signal from the control system 300, and the optical fibers 130 transfer lights from the plurality of lighting units 110 or a light mixed in the mixer 140.

The mixer 140, prepared in a chamber form, collects and mixes lights illuminated from the plurality of lighting units 110. The connection unit 150 connects the optical fibers 130 connected to the mixer unit 140 and the camera 200 in order for a light mixed by the mixer 140 to be transferred to the camera 200.

However, a detailed configuration of the above-described lighting device 100 is an example and may be differently realized.

The camera 200 includes a plurality of pixels detecting lights to convert a reflective light from the examination target object into a digital image, and may be typically cheap monochrome camera.

In an image captured by the camera 200, a grey level I(x,y) of each pixel and a voltage v applied to the plurality of lighting units have the following relationship; I(x, y)=f(v).

There is a standard deviation σ, as an index representing definition of a digital image. In an image having m×n pixels, the grey level standard deviation σ may be determined any one of the following equations:

$$\sigma = \sqrt[2]{\frac{1}{mn}\sum_{x}^{m}\sum_{y}^{n}(I(x,y)-Imean)^2} \qquad (1)$$

$$\sigma = \frac{1}{mn}\sum_{x}^{m}\sum_{y}^{n}[|I(x+1,y)-I(x,y)|+|I(x,y+1)-I(x,y)|] \qquad (2)$$

$$\sigma = \sqrt[2]{\frac{1}{mn}\sum_{x}^{m}\sum_{y}^{n}[\{I(x+1,y)-I(x,y)\}^2+\{I(x,y+1)-I(x,y)\}^2]} \qquad (3)$$

$$\sigma = \sum_{x}^{m}\sum_{y}^{n}I(x+1,y)I(x,y)+\sum_{x}^{m}\sum_{y}^{n}I(x,y+1)I(x,y)- \qquad (4)$$
$$\sum_{x}^{m}\sum_{y}^{n}I(x+2,y)I(x,y)-\sum_{x}^{m}\sum_{y}^{n}I(x,y+2)I(x,y)$$

$$\sigma = \sum_{0}^{GREY\ LEVEL_{max}} p_i\log_2 p_i \qquad (5)$$

where, m denotes the number of pixels in a horizontal axis of the image, n denotes the number of pixels in a vertical axis of the image, I(x,y) denotes a grey level value in a pixel corresponding x,y coordinate in the image, Imean denotes an average value of grey levels of an overall image, pi(=h(i)/mn) denotes a normalized value on image histogram, and h(i) denotes the number of pixels.

Furthermore, the control system 300 includes a logic capable of searching rapidly an input voltage value V, which allows the standard deviation σ to be a maximum, as described below.

Figure 3:
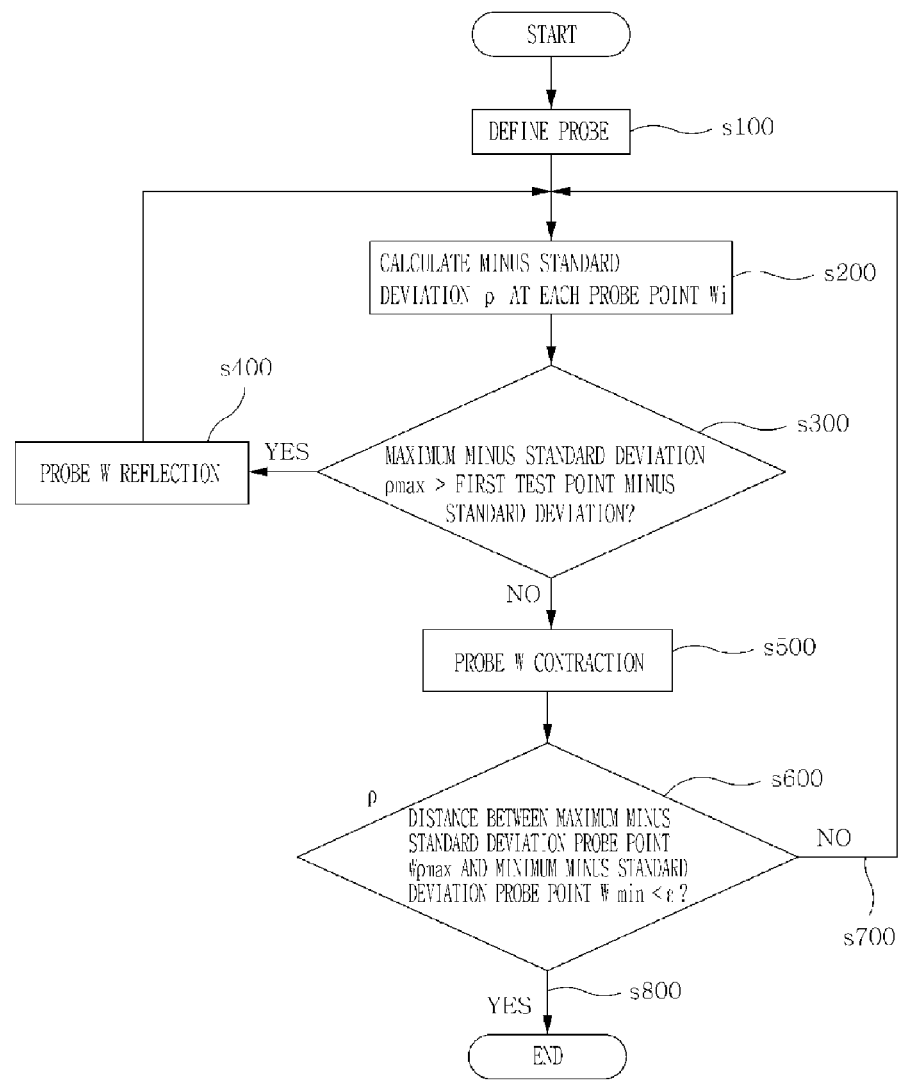
FIG. 3 is a flow chart illustrating an overall method of controlling color lighting in vision system according to the invention.
Figure 4:
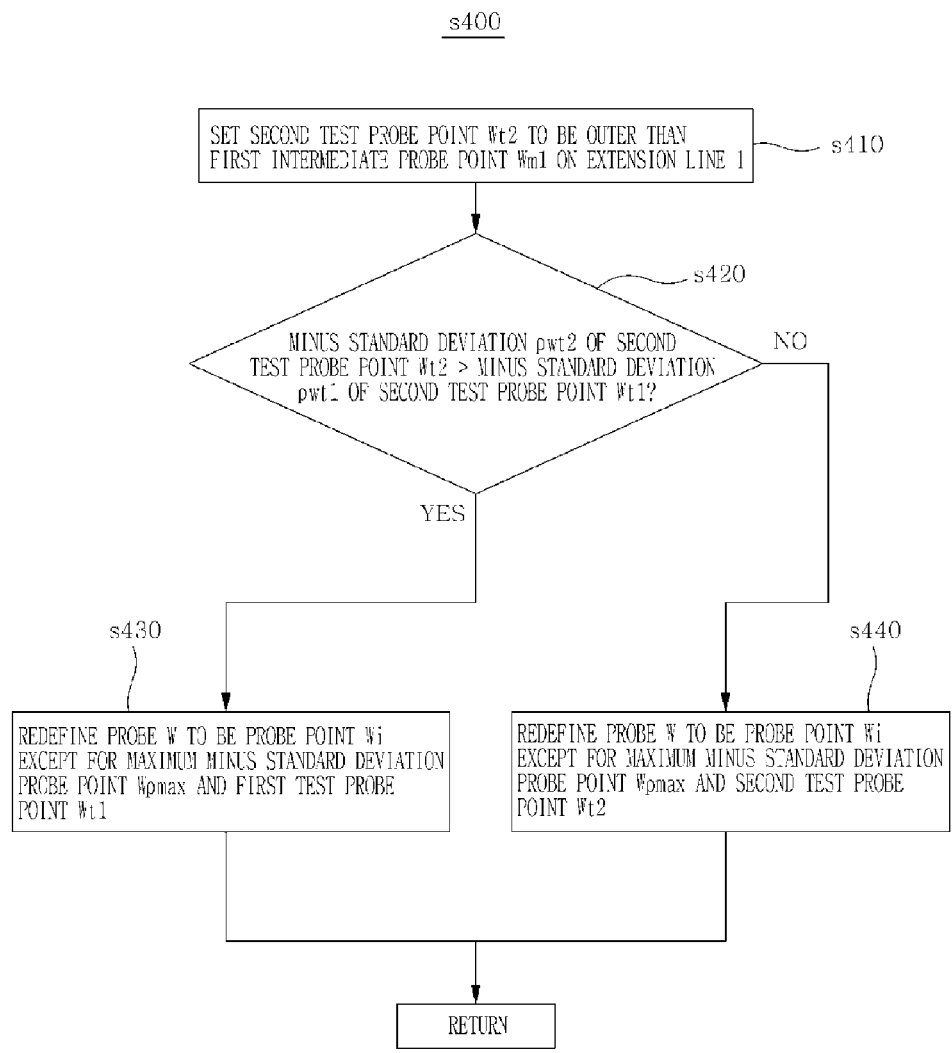
FIG. 4 illustrates operation s400 in the method of controlling color lighting in a vision system according to the invention.
Figure 6:
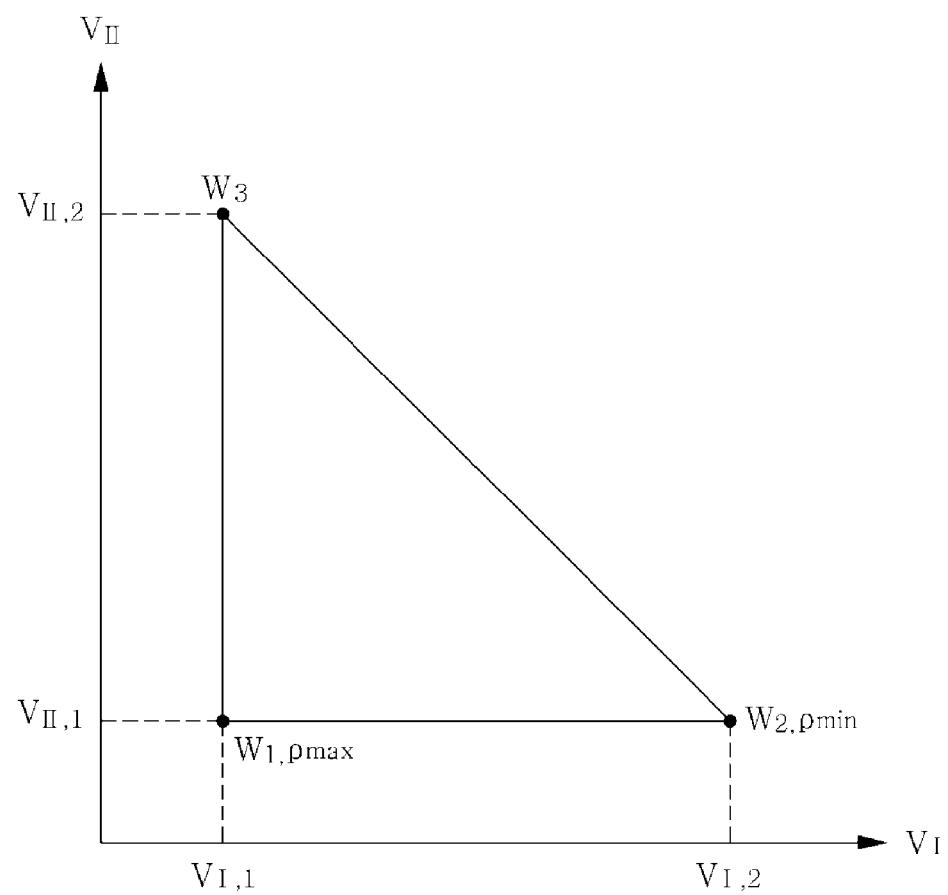
FIG. 6 illustrates a definition of a probe in operation S100 of the method of controlling color lighting in a vision system according to the invention.

FIG. 3 is a flow chart illustrating an overall method of controlling color lighting in vision system of the invention. FIG. 4 illustrates operation s400 in a method of controlling color lighting in a vision system of the invention. FIG. 6 illustrates a definition of a probe in operation s100 in a method of controlling color lighting of the invention.

First, operation s100 is performed for defining a probe W for a plurality of lightings.

$$\begin{bmatrix} W_1 \\ W_2 \\ W_3 \\ \vdots \\ W_{n+1} \end{bmatrix} = \begin{bmatrix} V_{I,1} & V_{II,1} & \ldots & V_{n,1} \\ V_{I,2} & V_{II,2} & \ldots & V_{n,2} \\ V_{I,3} & V_{II,3} & \ldots & V_{n,3} \\ \vdots & \vdots & & \vdots \\ V_{I,n+1} & V_{II,n+1} & \ldots & V_{n,n+1} \end{bmatrix} \quad (6)$$

where, $V_{I,1}, V_{II,1}, \ldots V_n$ denote each voltage in lightings having different wavelengths, and n denotes the number of lightings having different wavelengths.

The probe W in the invention is formed to have (n+1) prove points Wi.

Accordingly, in case of two lightings as shown in FIGS. 6 to 12, the probe may be shown as a triangle, and in case of three lightings, the probe may be shown as a triangular pyramid. However, the probe in the invention is a virtual concept and the above-described shapes are only for description.

In addition, in the embodiment, a case where the probe W is a right-angled triangle is described for two lightings, but the invention is not limited thereto, and other types of triangle may be also adopted.

Next, for each probe point Wi in operation s100, operation s200 is performed for calculating a minus standard deviation ρ according to the flowing equation;

$$\text{a minus standard deviation } \rho = -\text{standard deviation } \sigma \quad (7)$$

$$\sigma = \sqrt[2]{\frac{1}{mn} \sum_x^m \sum_y^n (I(x, y) - Imean)^2} \quad (8)$$

where, m denotes the number of pixels in a horizontal axis of an image, n denotes the number of pixels in a vertical axis of an image, I(x,y) denotes a grey level value in a pixel corresponding x,y coordinate in the image, and Imean denotes an average value of grey levels of an overall image.

The reason why the minus standard deviation ρ is used in the invention is as follows.

In order to search for optimal lighting voltage conditions in a vision system, a voltage value is to be searched for allowing the standard deviation σ of a grey level to be a maximum. Also, since optimization algorithms are configured to be proper to find out a minimum value, it is more proper to use minus standard deviation ρ instead of a standard deviation σ to use the optimization algorithms.

The minus standard deviation ρ is calculated by using equation 1 in the invention, but equations 2 to 5 may also be used to calculate the minus standard deviation ρ.

In addition, for description's convenience, it is assumed that a probe point W1 has a maximum minus standard deviation ρmax, and a probe pint w2 has a minimum minus standard deviation ρmin. In practice, there are cases different from this case.

Figure 7:
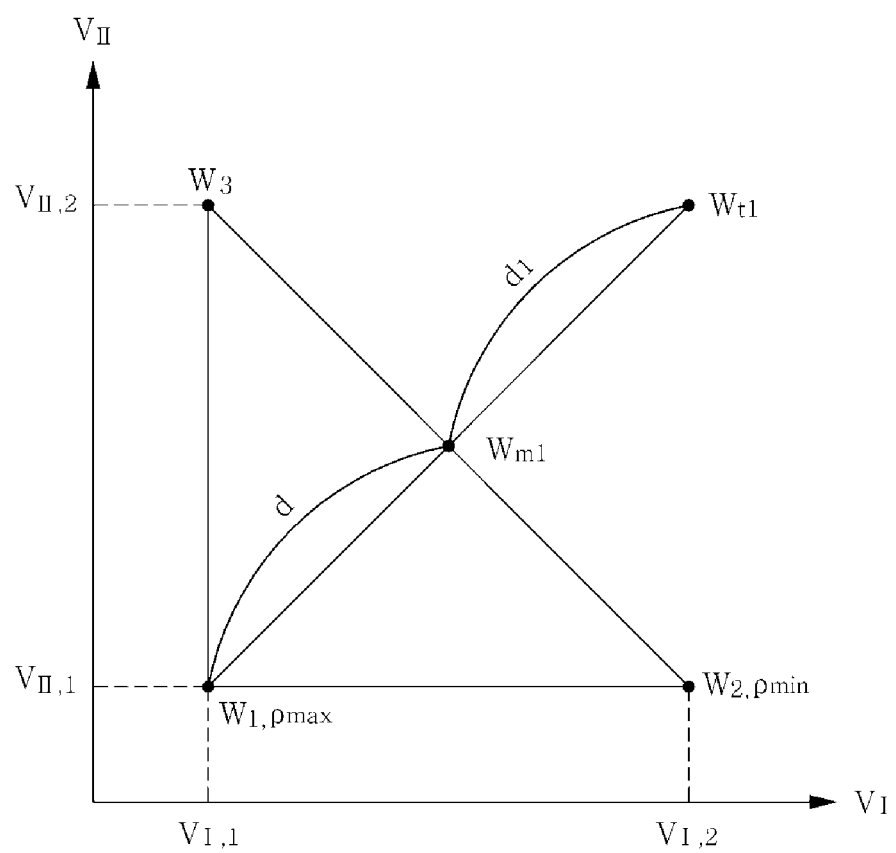
FIG. 7 illustrates setting a first test probe point in operation S300 of the method of controlling color lighting in a vision system according to the invention.

FIG. 7 illustrates setting of a first test probe point in operation s300 in a method of controlling color lighting in a vision system of the invention.

Then, the maximum minus standard deviation ρmax is searched for, which is the largest from among minus standard deviations ρwi for each probe point Wi calculated in operation s200, and operation s300 is performed for comparing the searched maximum minus standard deviation ρmax and the minus standard deviation ρwt1 of the first test probe point Wt1.

In order to set the first test probe point Wt1, a first intermediate probe point Wm1 is set in advance.

The first intermediate probe point Wm1 is set, as shown in FIG. 7, to an arithmetic average of coordinate values of the rest of probe points Wi except for the maximum minus standard deviation probe point Wρmax.

Furthermore, the first test probe point Wt1 is formed to be outer than the first intermediate probe point Wm1 on an extension line connecting the maximum minus standard deviation probe point Wρmax and the first intermediate probe point Wm1.

In the embodiment, a distance d1 between the first test probe point Wt1 and the first intermediate probe point Wm1 is formed to be the same as a distance d between the maximum minus standard deviation probe point Wρmax and the first intermediate probe point Wm1, but the invention is not limited thereto. The distance d1 is possible to be differently formed.

Figure 8:
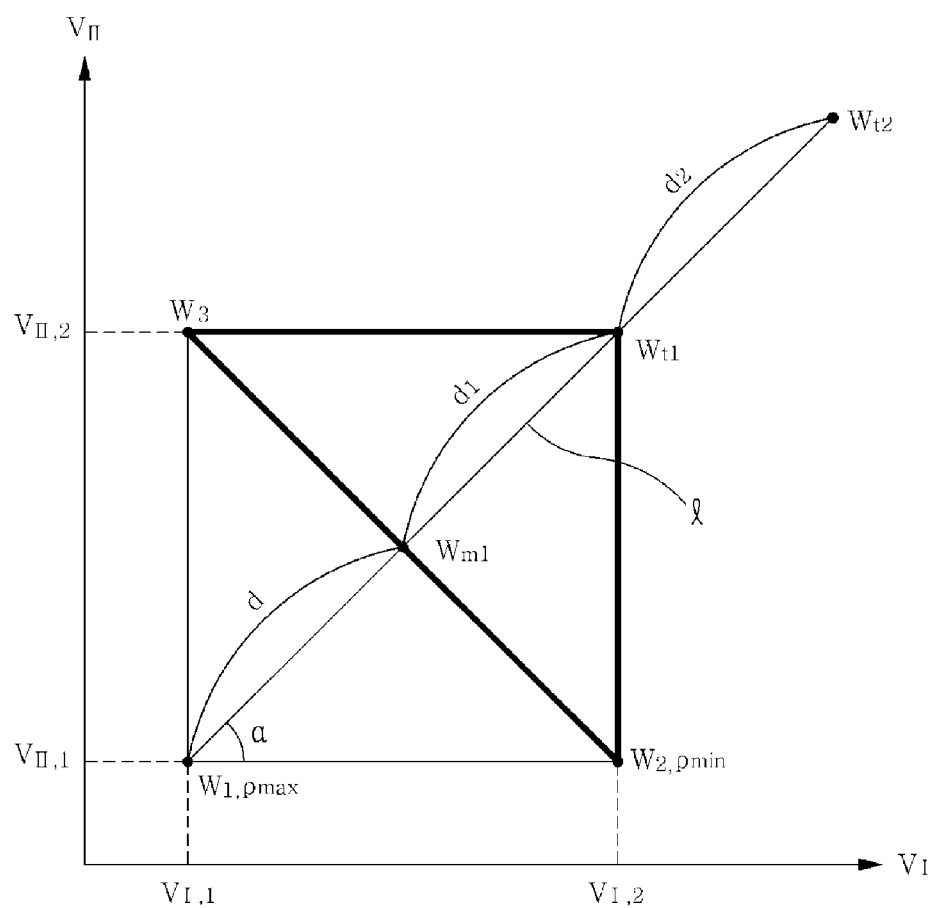
FIG. 8 illustrates operation s430 in the method of controlling color lighting in a vision system according to the invention.

FIG. 8 illustrates operation s430 in a method of controlling color lighting in a vision system of the invention.

In operation s300, when the maximum minus standard deviation probe point Wρmax is larger than a minus standard deviation ρwt1 at the first intermediate probe point Wm1, a probe reflection operation s400 is performed.

The probe reflecting operation s400 is formed of, as shown in FIG. 4, operations s410 to s440.

First, as shown in FIG. 8, operation s410 is performed for setting a second test probe point Wt2 to be outer than the first test probe point Wt1 along the extension line l.

In the embodiment, a distance d2 between the first and second test probe points Wt1 and Wt2 is formed to be the same as a distance d1 between the first test probe point Wt1 and the first intermediate probe point Wm1, but the invention is not limited thereto. The distance d2 is also possible to be differently formed.

Then, operation s420 is performed for comparing a minus standard deviation ρwt1 at the first test probe point Wt1 and a minus standard deviation ρwt2 at the second test probe point wt2.

When the minus standard deviation ρwt2 at the second test probe point wt2 is larger than the minus standard deviation ρwt1 at the first test probe point Wt1 in the operation s420, operation s430 is performed, as shown in FIG. 8, for redefining a probe W to be the first test probe point Wt1 and other probe points Wi except for the maximum minus standard deviation probe point Wρmax, and returning to the operation s200.

In the embodiment, the probe W is redefined to be the probe point W2, the probe point W3, and the first probe point Wt1.

Figure 9:
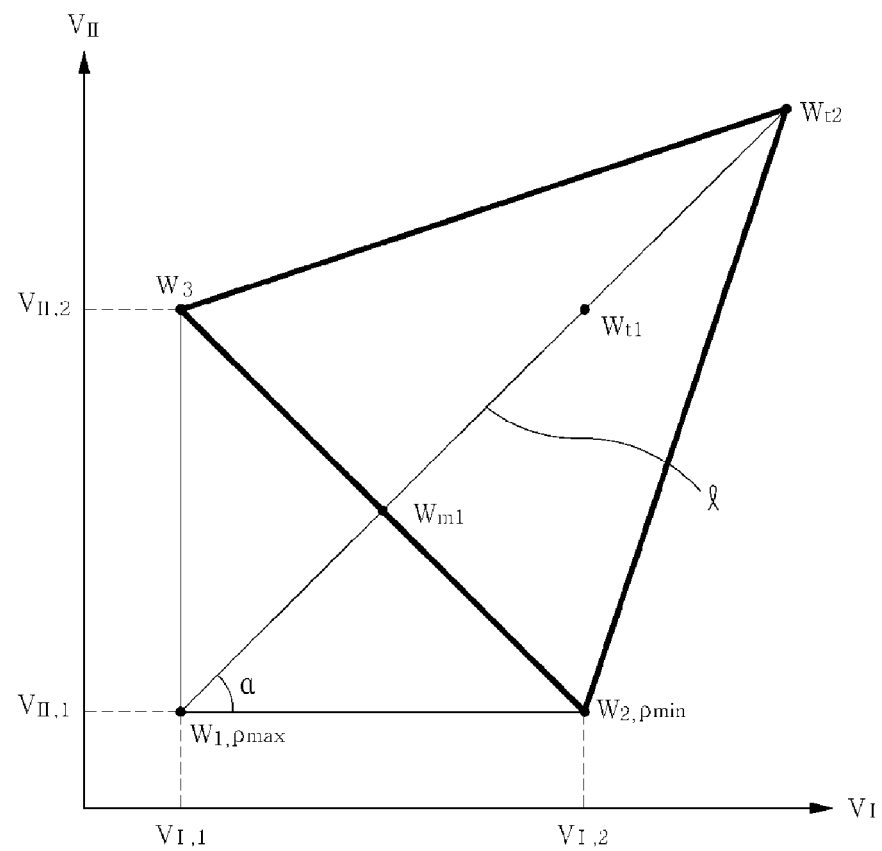
FIG. 9 illustrates operation s440 in the method of controlling color lighting in a vision system according to the invention.

FIG. 9 illustrates operation s440 in a method of controlling color lighting in a vision system of the invention.

When the minus standard deviation ρwt2 at the second test probe point wt2 is smaller than the minus standard deviation ρwt1 at the first test probe point wt1 in operation s420, operation s440 is performed, as shown in FIG. 8, for redefining the probe to be other probe point Wi except for the maximum minus standard deviation probe point Wρmax and the second test probe point Wt2, and then returning to operation s200.

In the embodiment, the probe W is redefined to be the probe point W2, a probe point W3. And the second probe point Wt2.

In operation s300, when the maximum minus standard deviation probe point Wρmax is smaller than the minus standard deviation ρwt1 at the first test probe point wt1, a probe contraction is performed (operation s500).

Figure 5:
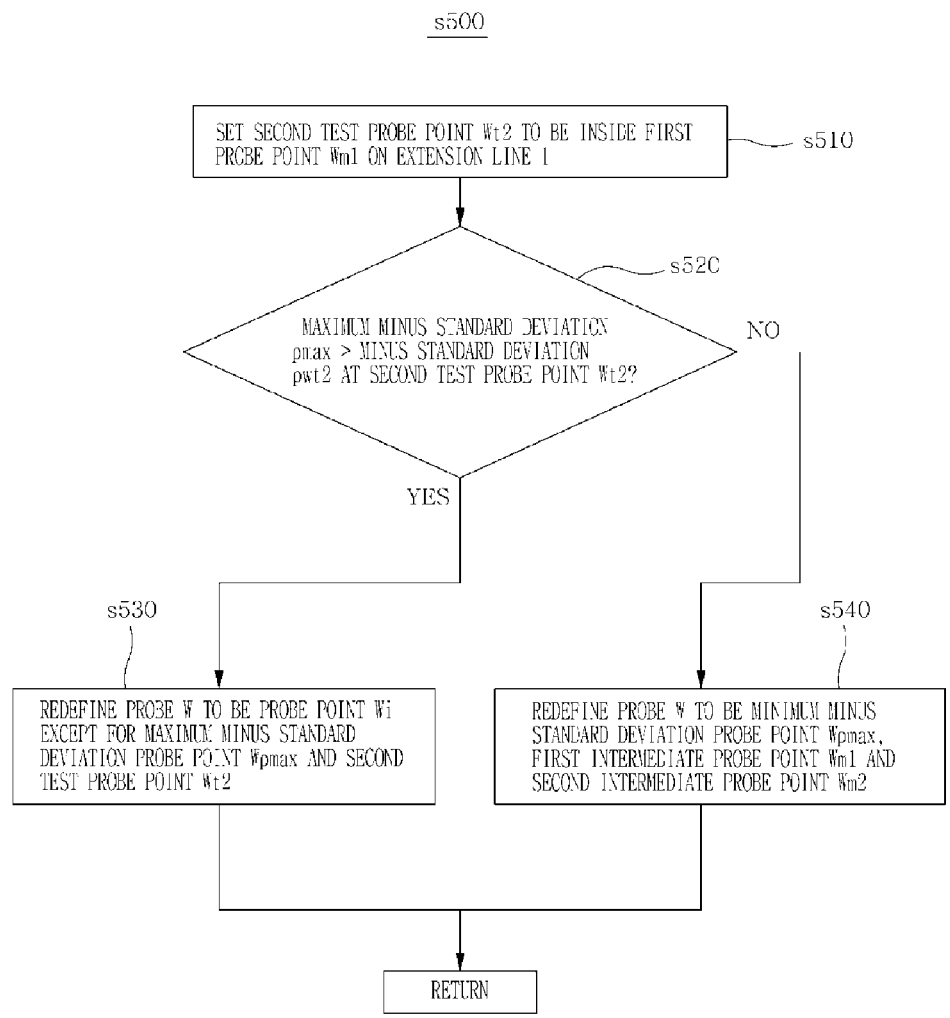
FIG. 5 illustrates operation s500 in the method of controlling color lighting in a vision system according to the invention.

The probe contraction (operation s500) is, as shown in FIG. 5, formed of operation s510 to operation s540.

Figure 10:
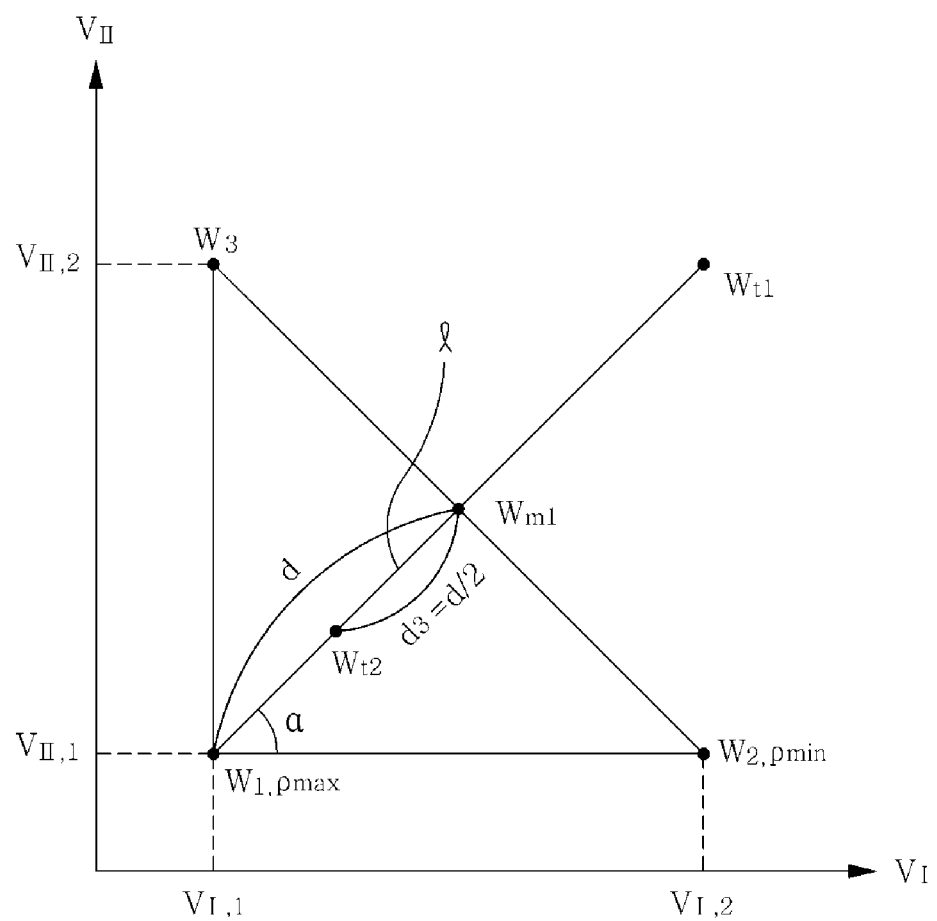
FIG. 10 illustrates operation s510 in the method of controlling color lighting in a vision system according to the invention.

FIG. 10 illustrates operation s510 in a method of controlling color lighting in a vision system of the invention.

First, as shown in FIG. 10, operation s510 is performed for setting the second probe point Wt2 to be inside the first intermediate probe point Wm1 along the extension line l.

In the embodiment, a distance d3 between the first intermediate probe point Wm1 and the second test probe point Wt2 is a half of a distance d between the maximum minus standard deviation probe point Wρmax and the first intermediate probe point Wm1, but is not limited thereto, and may be formed of other distances.

Then, operation s520 is performed for comparing the maximum minus standard deviation probe point Wρmax and the minus standard deviation ρwt2 at the second test probe point wt2.

Figure 11:
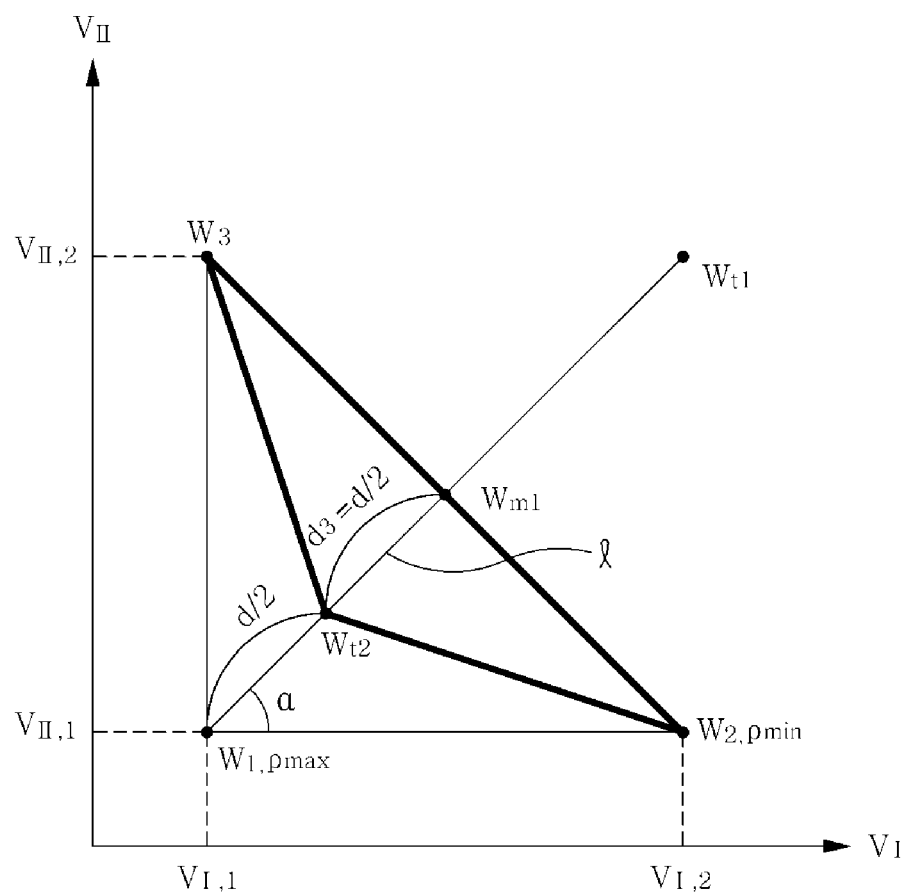
FIG. 11 illustrates operation s530 in the method of controlling color lighting in a vision system according to the invention.

FIG. 11 illustrates operation s530 in a method of controlling color lighting in a vision system of the invention.

When the maximum minus standard deviation probe point Wρmax is larger than the minus standard deviation ρwt2 at the second test probe point wt2 in operation s510, operation s530 is performed, as shown in FIG. 11, for redefining the probe to be other probe points Wi except for the maximum minus standard deviation probe point Wρmax and the second test probe point Wt2.

In the embodiment, the probe W is redefined to be the probe point W2, the probe point W3, and the second test probe point Wt2.

Figure 12:
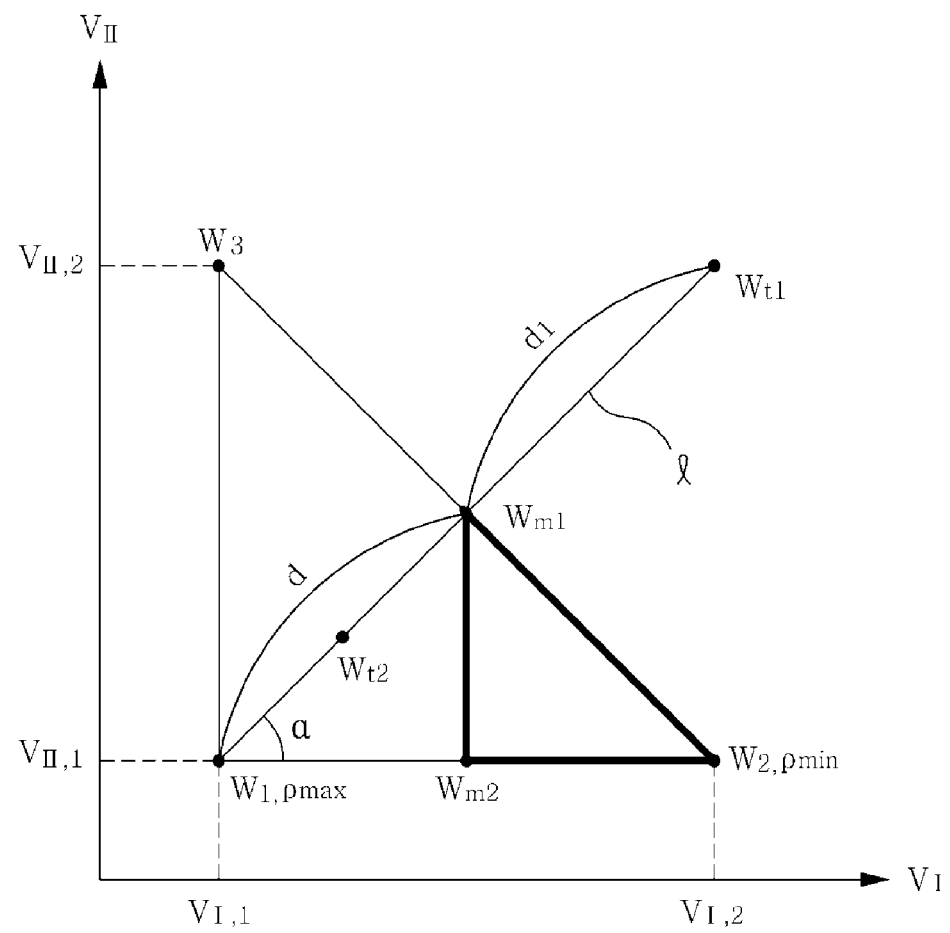
FIG. 12 illustrates operation s540 in the method of controlling color lighting in a vision system according to the invention.

FIG. 12 illustrates operation s540 in a method of controlling color lighting in a vision system of the invention.

When the maximum minus standard deviation probe point Wρmax is smaller than the minus standard deviation ρwt2 at the second test probe point wt2 in the operation s510, operation s540 is performed, as shown in FIG. 12, for redefining the probe to be the probe point W2, which is a minimum minus standard deviation probe point Wρmin, the first intermediate probe point Wm1, and the second intermediate probe point Wm2.

Here, the second intermediate probe point Wm2 is an arithmetic average probe point of coordinate values between the minimum minus standard deviation probe point Wρmin and the maximum minus standard deviation probe point Wρmax.

In operation s530 or operation s540, when a distance between the maximum minus standard deviation probe point Wρmax and the minimum minus standard deviation probe point Wρmin is larger than a predetermined reference value c, returning to operation s200 is performed (operation s700).

Furthermore, at each probe in operation s530 or operation s540, the distance between the maximum minus standard deviation probe point Wρmax and the minimum minus standard deviation probe point Wρmin is smaller than the reference value c, the operations are ended (operation s800).

In these operations, when a plurality of voltage values are secured to allow the minus standard deviation ρ to be a minimum, and the plurality of voltage values are used as voltage values for color lighting in a vision system, it is enabled to secure optimal images for a product, which are necessary for a vision system.

In the invention, by using a concept of the probe W, voltages proper to obtain optimal images for a plurality of lightings are rapidly obtained.

In the embodiment, a vision system having two lightings is described, but, even in a case of three or more lightings, a plurality of voltage values for obtaining optimal images can be rapidly searched by an identical algorithm.

According to the invention, a voltage value, which allows an optimal product image to be obtained, can be rapidly searched for in a vision system including a plurality of lightings.

Due to this, examination speed is excessively increased and a time taken for product examination is reduced so that a process yield ratio is improved.

According to the invention, especially when the number of lightings increases, a voltage value for obtaining an optimal image can be further rapidly searched for.

What is claimed is:

1. A method of controlling color lighting in a vision system including a plurality of lightings of different wavelengths and allowing voltages of the plurality of lightings for obtaining optimal images to be searched for, the method comprising:

(S100) defining a probe W for the plurality of lightings as the following, $$\begin{bmatrix} W_1 \\ W_2 \\ W_3 \\ \vdots \\ W_{n+1} \end{bmatrix} = \begin{bmatrix} V_{I,1} & V_{II,1} & \ldots & V_{n,1} \\ V_{I,2} & V_{II,2} & \ldots & V_{n,2} \\ V_{I,3} & V_{II,3} & \ldots & V_{n,3} \\ \vdots & \vdots & & \vdots \\ V_{I,n+1} & V_{II,n+1} & \ldots & V_{n,n+1} \end{bmatrix}$$

where $V_{I,1}$, $V_{II,1}$, $V_{III,1}$, . . . denote respective arbitrary voltages for lightings, and n denotes the number of lightings having different wavelengths;

(s200) calculating a minus standard deviation ρ for each probe point Wi according to the following equation, a minus standard deviation ρ=−standard deviation σ

$$\sigma = \sqrt[2]{\frac{1}{mn} \sum_x^m \sum_y^n (I(x, y) - Imean)^2}$$

where m denotes the number of pixels in a horizontal axis in an image, n denotes the number of pixels in a vertical axis in the image, I(x,y) denotes a grey level value of a pixel corresponding to x,y coordinate in the image, and Imean denotes an average value of grey level values of an entire image;

(s300) searching a largest maximum minus standard deviation ρmax from among minus standard deviations ρwi for probe points wi calculated in operation s200, and comparing the searched results with a minus standard deviation ρwt1 at a first test probe point Wt1, wherein a first test probe point Wt1 is formed to be outer than a first intermediate probe point Wm1 on an extension line which is formed by connecting the first intermediate probe point Wm1 and the maximum minus standard deviation probe point Wρmax, wherein the first intermediate probe point Wm1 is obtained by arithmetically averaging coordinate values of other probe points Wi except for the maximum minus standard deviation probe point Wρmax;

(s410) when the maximum minus standard deviation probe point Wρmax is larger than a minus standard deviation ρwt1 at the first test probe point Wt1 in operation 300, setting a second test probe point Wt2 to be outer than the first test probe point Wt1 along the extension line;

(s420) comparing the minus standard deviation ρwt1 at the first test probe point Wt1 and a minus standard deviation ρwt2 at the second test probe point Wt2;

(S430) when the minus standard deviation ρwt2 at the second test probe point Wt2 is larger than the minus standard deviation ρwt1 at the first test probe point Wt1 in operation s420, redefining the probe to be other points Wi except for the maximum minus standard deviation probe point Wρmax, and the first test probe point Wt1, and returning to operation s200;

(S440) when the minus standard deviation ρwt2 at the second test probe point Wt2 is smaller than the minus standard deviation ρwt1 at the first test probe point Wt1 in operation s420, redefining the probe to be other points Wi except for the maximum minus standard deviation probe point Wρmax, and the second test probe point Wt2, and returning to operation s200;

(S510) when the maximum minus standard deviation ρmax is smaller than the minus standard deviation ρwt1 at the first test probe point Wt1 in operation s300, setting the second probe point Wt2 to be inside the first intermediate probe point Wm1 along the extension line;

(S520) comparing the maximum minus standard deviation ρmax and the minus standard deviation ρwt2 at the second test probe point Wt2;

(s530) when the maximum minus standard deviation ρmax is larger than the minus standard deviation ρwt2 at the second test probe point Wt2 in operation s520, redefining the probe to be other probe points Wi except for the maximum minus standard deviation probe point Wρmax and the second test probe point Wt2;

(s540) when the maximum minus standard deviation ρmax is smaller than the minus standard deviation ρwt2 at the second test probe point Wt2 in operation s520, redefining the probe to be the maximum minus standard deviation probe point Wρmax, the first intermediate probe point Wm1, and a second intermediate probe point Wm2, wherein the second intermediate probe point Wm2 is obtained by arithmetically averaging coordinate values of the minimum minus standard deviation probe point Wρmin and the maximum minus standard deviation probe point Wρmax;

(s700) when a distance between the minimum minus standard deviation probe point Wρmin and the maximum minus standard deviation probe point Wρmax is larger than a reference value in operation s530 or s540, returning to operation s200; and (s800) when the distance between the minimum minus standard deviation probe point Wρmin and the maximum minus standard deviation probe point Wρmax is smaller than the reference value in operation s530 or s540, ending the operations.

2. The method of claim 1, wherein, in operation s200, the minus standard deviation is calculated by the following equation, $$\sigma = \frac{1}{mn}\sum_{x}^{m}\sum_{y}^{n}[|I(x+1,y)-I(x,y)|+|I(x,y+1)-I(x,y)|].$$

3. The method of claim 1, wherein, in operation s200, the minus standard deviation is calculated by the following equation, $$\sigma = \sqrt[2]{\frac{1}{mn}\sum_{x}^{m}\sum_{y}^{n}[\{I(x+1,y)-I(x,y)\}^2+\{I(x,y+1)-I(x,y)\}^2]}.$$

4. The method of claim 1, wherein, in operation s200, the minus standard deviation is calculated by the following equation, $$\sigma = \sum_{x}^{m}\sum_{y}^{n}I(x+1,y)I(x,y)+\sum_{x}^{m}\sum_{y}^{n}I(x,y+1)I(x,y)-\sum_{x}^{m}\sum_{y}^{n}I(x+2,y)I(x,y)-\sum_{x}^{m}\sum_{y}^{n}I(x,y+2)I(x,y).$$

5. The method of claim 1, wherein, in operation s200, the minus standard deviation is calculated by the following equation, $$\sigma = \sum_{0}^{GREYLEVEL_{max}} p_i \log_2 p_i$$

where pi(=h(i)/mn) denotes a normalized value on image histogram, and h(i) denotes the number of pixels.

6. The method of claim 1, wherein, in operation s300, a distance d1 between the test probe point Wt1 and the first intermediate probe point Wm1 is the same as a distance d between the maximum minus standard deviation probe point Wρmax and the first intermediate probe point Wm1.

7. The method of claim 1, wherein, in operation s410, a distance d2 between the first and second test probe points Wt1 and Wt2 is the same as a distance d1 between the first test probe point Wt1 and the first intermediate probe point Wm1.

8. The method of claim 1, wherein in operation s510, a distance d3 between the first intermediate probe point Wm1 and the second test probe point Wt2 is a half of a distance d between the maximum minus standard deviation probe point Wρmax and the first intermediate probe point Wm1.

* * * * *